United States Patent
Huang (10) Patent No.: US 11,585,311 B2
(45) Date of Patent: Feb. 21, 2023

(54) DISTRIBUTOR WITH HEAT DISSIPATION EFFECT

(71) Applicant: Hsun Chien Huang, New Taipei (TW)

(72) Inventor: Hsun Chien Huang, New Taipei (TW)

(*) Notice: Subject to any disclaimer, the term of this patent is extended or adjusted under 35 U.S.C. 154(b) by 307 days.

(21) Appl. No.: 17/124,716

(22) Filed: Dec. 17, 2020

(65) Prior Publication Data

US 2022/0195973 A1 Jun. 23, 2022

(51) Int. Cl.
*F02P 7/02* (2006.01)
*F16H 57/04* (2010.01)
*F16H 57/02* (2012.01)

(52) U.S. Cl.
CPC .......... *F02P 7/022* (2013.01); *F16H 57/0419* (2013.01); *F16H 2057/02082* (2013.01)

(58) Field of Classification Search
CPC ....... F02P 7/022; F02P 7/021; F16H 57/0419; F16H 2057/02082; F16H 1/20; F16H 2057/02034
See application file for complete search history.

(56) References Cited

U.S. PATENT DOCUMENTS

| | | | | |
|---|---|---|---|---|
| 3,799,135 | A * | 3/1974 | House | F02P 7/022 200/8 R |
| 3,838,207 | A * | 9/1974 | Anselment | F02P 7/025 200/19.38 |
| 3,998,196 | A * | 12/1976 | House | F02P 7/022 200/19.32 |
| 4,333,433 | A * | 6/1982 | Mattson | F02P 5/06 310/70 R |
| 5,513,617 | A * | 5/1996 | Bass | F02P 5/02 123/406.53 |

FOREIGN PATENT DOCUMENTS

JP 52032434 A * 3/1977

* cited by examiner

*Primary Examiner* — Hung Q Nguyen
(74) *Attorney, Agent, or Firm* — Birch, Stewart, Kolasch & Birch, LLP (57) ABSTRACT

A distributor with heat dissipation effect has an ignition device having includes a distributor upper cap, a rotor assembly and a distributor bowl-shaped lower cap, a transmission device connected between the distributor bowl-shaped lower cap and the rotor assembly, and a heat insulation pad held between the distributor bowl-shaped lower cap and the transmission device. When the distributor is assembled on an engine, heat from the engine can be effectively isolated and heat from the ignition device can also be dissipates by the heat insulation pad.

10 Claims, 7 Drawing Sheets

DISTRIBUTOR WITH HEAT DISSIPATION EFFECT

BACKGROUND OF THE INVENTION

1. Field of the Invention

The present invention relates to a distributor, especially to a distributor with heat insulation and dissipation effect.

2. Description of the Prior Art(s)

A distributor is used for allocating ignition sequence of spark plugs assembled in an engine. In a conventional distributor, semiconductor circuits have been used to control ignition timing. The advantages of using the semiconductor circuits to control the ignition timing are that wear of platinum contacts and volume of the conventional distributor can be reduced, and different sensing signals, such as starting to accelerate and adjusting ignition angles automatically, can be accepted easily. Moreover, the conventional distributor may have a transmission gear mechanism having a driving shaft connected to the engine and a driven shaft connected to a rotor of the conventional distributor. The driving shaft is provided with a relatively small gear and the driven shaft is provided with a relatively large gear. The relatively small gear and the relatively large gear are disposed on a same plane and mesh with each other, such that a rotation speed of the driven shaft can be reduced.

However, during operation, the conventional distributor withstands high temperature. In addition to heat generated by ignition system of the conventional distributor, heat from the engine also increases the temperature of the conventional distributor since the conventional distributor is connected to the engine. Consequently, the conventional distributor is in the high temperature during operation.

Furthermore, since there are semiconductor components mounted in the conventional distributor and the semiconductor components are not resistant to high temperature, a service life and reliability of the conventional distributor are low and a performance of the engine is also low. In addition, in the transmission gear mechanism, as the relatively small gear and the relatively large gear are disposed on the same plane, a radial width of the transmission gear mechanism is large, causing a total volume of the conventional distributor being large. Consequently, when a user is adjusting the ignition angles, the conventional distributor interferes with peripheral components of the engine.

To overcome the shortcomings, the present invention provides a distributor with heat dissipation effect to mitigate or obviate the aforementioned problems.

SUMMARY OF THE INVENTION

The main objective of the present invention is to provide a distributor with heat dissipation effect. The distributor has an ignition device, a transmission device, and a heat insulation pad.

The ignition device includes a distributor upper cap, a rotor assembly, and a distributor bowl-shaped lower cap. The distributor bowl-shaped lower cap has an assembling end surface and an open end formed on opposite ends of the distributor upper cap. The distributor upper cap is capped on and is combined with the open end of the distributor bowl-shaped lower cap, such that an inner space is enclosed by the distributor upper cap and the distributor bowl-shaped lower cap. The rotor assembly is mounted in the inner space.

The transmission device is connected to the rotor assembly and includes a transmission housing. The transmission housing has an inner surface facing the assembling end surface of the distributor bowl-shaped lower cap.

The heat insulation pad is held between the distributor bowl-shaped lower cap and the transmission device and abuts the assembling end surface of the distributor bowl-shaped lower cap and the inner surface of the transmission device.

With the transmission device disposed between an engine and the ignition device, heat from the engine can be effectively isolated and heat from the ignition device can also be dissipates by the heat insulation pad. Therefore, an operating temperature of the distributor of the present invention is kept stable, so that a service life of the distributor is increased and stability of the distributor during operation is improved.

Other objectives, advantages and novel features of the invention will become more apparent from the following detailed description when taken in conjunction with the accompanying drawings.

DETAILED DESCRIPTION OF THE PREFERRED EMBODIMENTS

Figure 1:
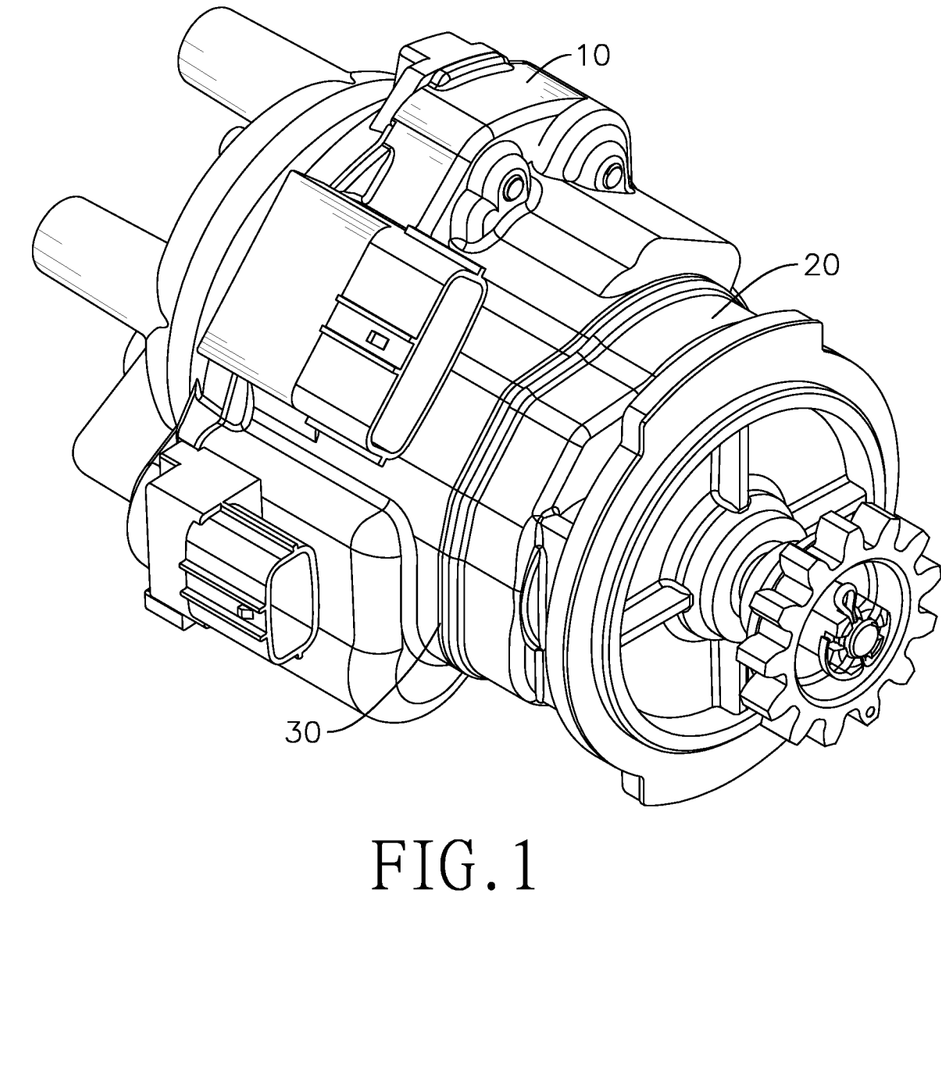
FIG. 1 is a perspective view of a distributor with heat dissipation effect in accordance with the present invention.
Figure 2:
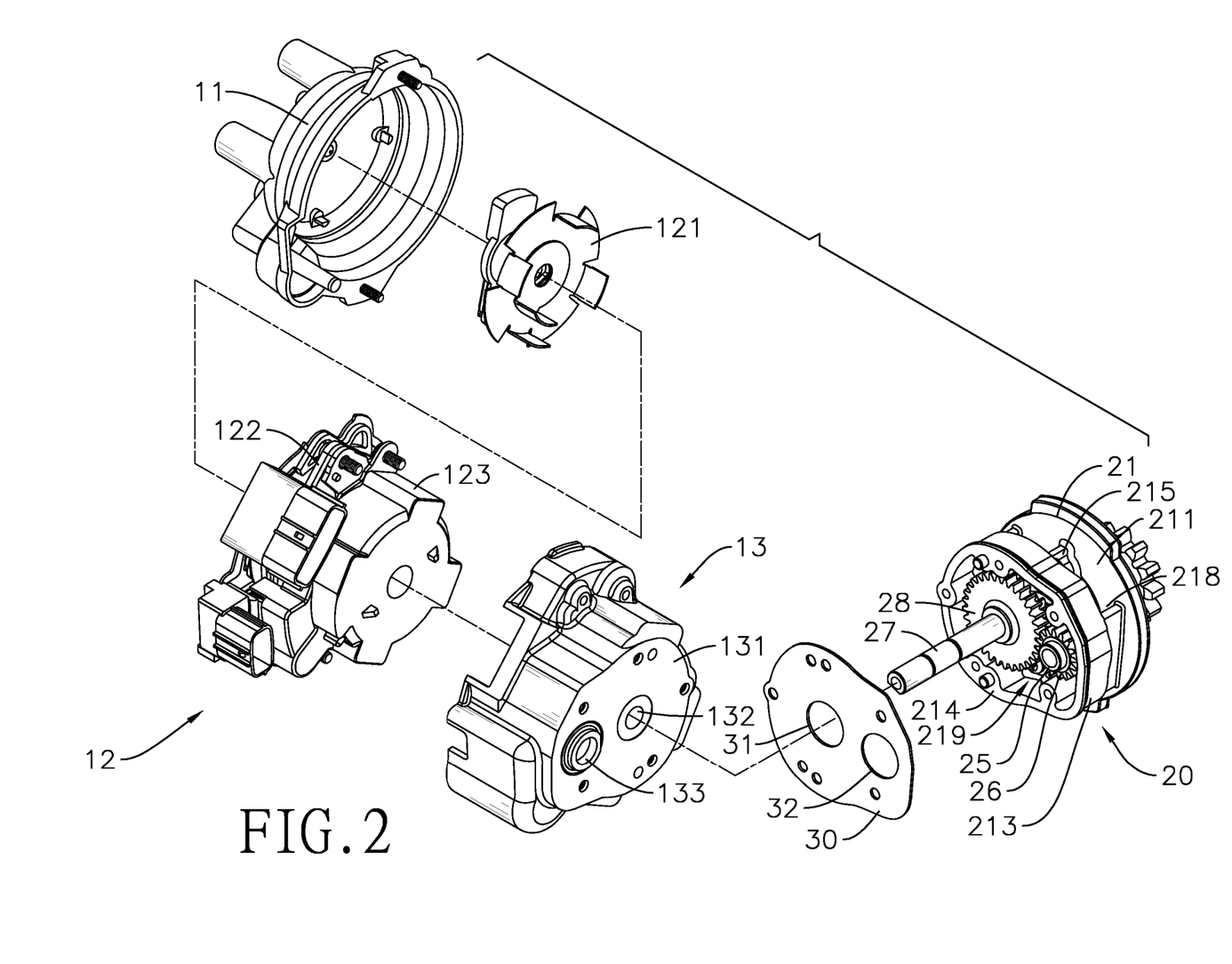
FIG. 2 is an exploded perspective view of the distributor in FIG. 1.

With reference to FIGS. 1 and 2, a distributor with heat dissipation effect in accordance with the present invention comprises an ignition device 10, a transmission device 20, and a heat insulation pad 30.

With reference to FIGS. 1 and 2, the ignition device 10 includes a distributor upper cap 11, a rotor assembly 12, and a distributor bowl-shaped lower cap 13.

The distributor upper cap 11 is a conventional standard component and thus a detailed description of a structure of the distributor upper cap 11 is omitted. The rotor assembly 12 included a rotor 121, an induction unit 122, and an ignition coil 123. However, the rotor assembly 12 is also a standard assembly and thus a detailed description of a structure of the rotor assembly 12 is omitted.

The distributor bowl-shaped lower cap 13 is a bowl-shaped casing and has an assembling end surface 131, an open end, a first assembling hole 132, and a second assembling hole 133. The assembling end surface 131 is formed on an end of the distributor bowl-shaped lower cap 13. The open end of the distributor bowl-shaped lower cap 13 is formed on another end of the distributor bowl-shaped lower cap 13 and is disposed opposite to the assembling end surface 131. The first assembling hole 132 and the second assembling hole 133 are separately formed through the assembling end surface 131. The distributor upper cap 11 is capped on and is combined with the open end of the distributor bowl-shaped lower cap 13, such that an inner space is enclosed by the distributor upper cap 11 and the distributor bowl-shaped lower cap 13. The rotor assembly 12 is mounted in the inner space. Heat generated by operation of the ignition device 10 is dissipated through a sidewall of the distributor bowl-shaped lower cap 13.

Figure 3:
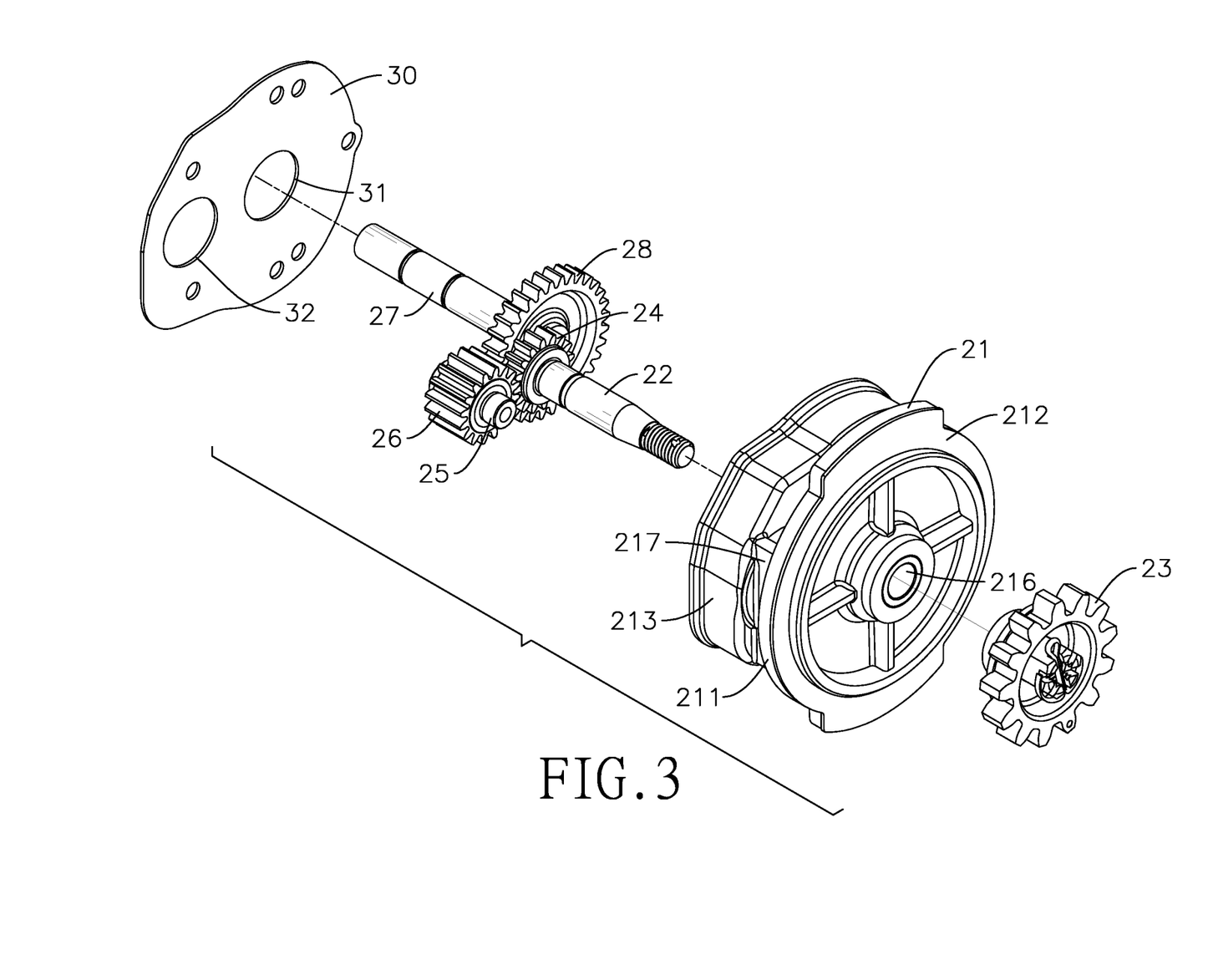
FIG. 3 is an exploded perspective view of a transmission device and an insulation pad of the distributor in FIG. 1.
Figure 4:
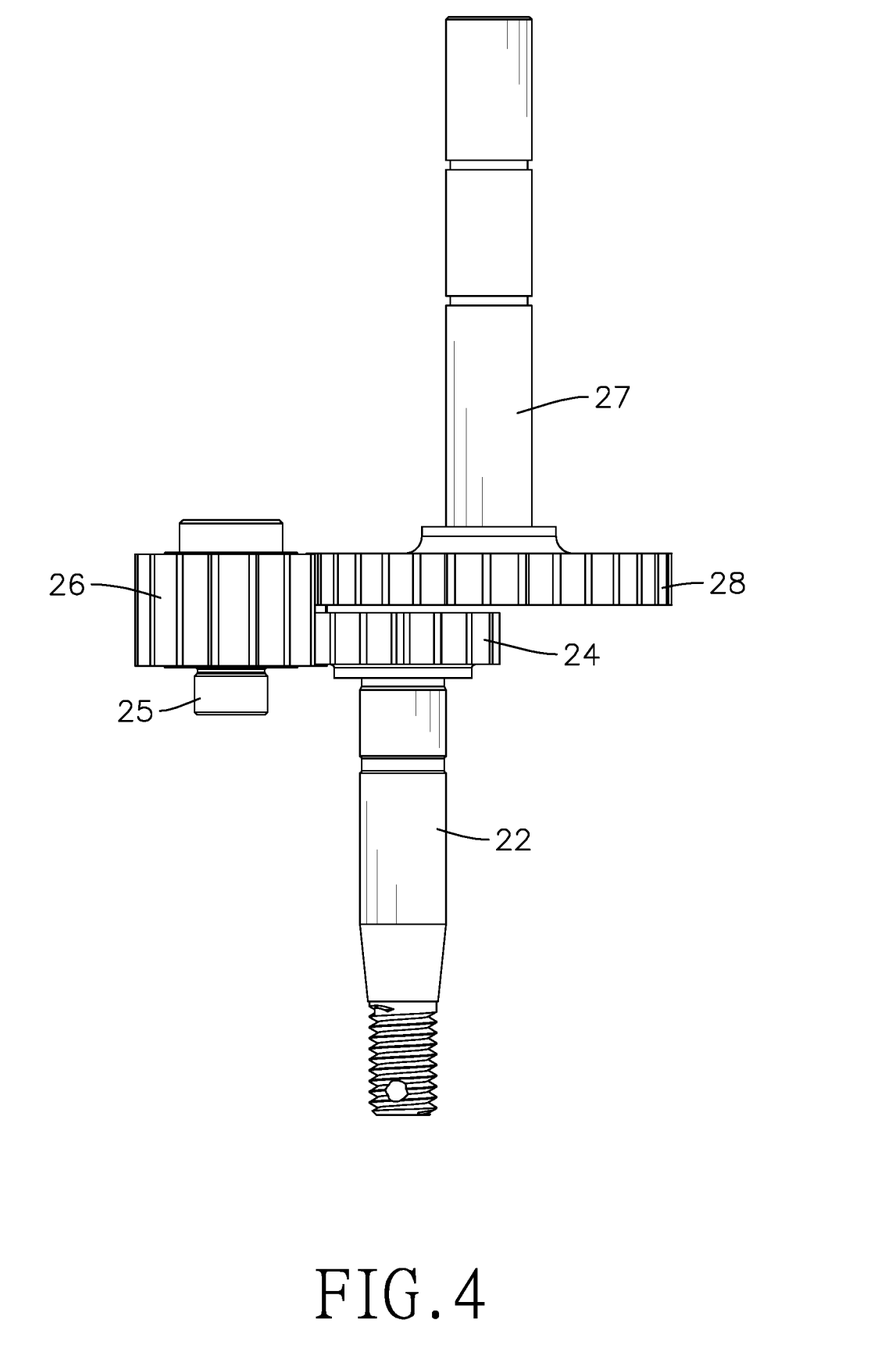
FIG. 4 is a partially side view of the transmission device of the distributor in FIG. 1.

With reference to FIGS. 2 and 3, the transmission device 20 is connected to the rotor assembly 12 and includes a transmission housing 21, a driving shaft 22, a driving connector 23, a driving gear 24, a driven shaft 25, a driven gear 26, a passive ignition shaft 27, and a reduction gear 28.

The transmission housing 21 has an outer side portion 211, an inner side portion 213, a driving hole 216, a connecting portion 215, and multiple reinforcing ribs 217. The outer side portion 211 is formed as a panel and has an outer surface 212. The inner side portion 213 has an inner surface 214 facing the assembling end surface 131 of the distributor bowl-shaped lower cap 13 and a mounting recess 219 formed in the inner surface 214. The connecting portion 215 is formed between the outer side portion 211 and the inner side portion 213. The driving hole 216 is formed through the transmission housing 21 and has two open ends defined through the outer surface 212 and the inner surface 214 respectively. The reinforcing ribs 217 are separately arranged between the outer side portion 211 and the inner side portion 213. Each of the reinforcing ribs 217 has two ends connected to the outer side portion 211 and the inner side portion 213 respectively. At least one heat dissipation hole 218 is formed between the reinforcing ribs 217.

With reference to FIGS. 2 to 4 and 7, the driving shaft 22 is rotatably mounted through the driving hole 216 and has two opposite ends. In the present embodiment, the driving connector 23 is a gear and is securely mounted on one of the ends of the driving shaft 22 and is disposed adjacent to the outer surface 212 of the transmission housing 21. The driving gear 24 is securely mounted on the other end of the driving shaft 22.

The driven shaft 25 has two opposite ends. One of the ends of the driven shaft 25 is rotatably mounted on the inner surface 214 of the transmission housing 21 and the other end of the driven shaft 25 is rotatably mounted in the second assembling hole 133 of the distributor bowl-shaped lower cap 13. The driven gear 26 is securely mounted on the driven shaft 25.

The passive ignition shaft 27 is mounted through the first assembling hole 132 and has a first end and a second end being opposite with each other. The first end of the passive ignition shaft 27 is mounted to the rotor assembly 12. Specifically, the first end of the passive ignition shaft 24 is mounted to the rotor 121 of the rotor assembly 12 (not shown). The reduction gear 28 is mounted on the second end of the passive ignition shaft 27. A rotation axis of the reduction gear 28 is parallel with a rotation axis of the driving gear 24. A meshing position, at which the reduction gear 28 meshes with the driven gear 26, and a meshing position, at which the driving gear 24 meshes with the driven gear 26, are adjacent to each other. Preferably, the reduction gear 28 and the driving gear 24 mesh with the driven gear 26 in a same tooth or in a same tooth space, and an outside diameter of the reduction gear 28 is larger than an outside diameter of the driving gear 24.

Figure 5:
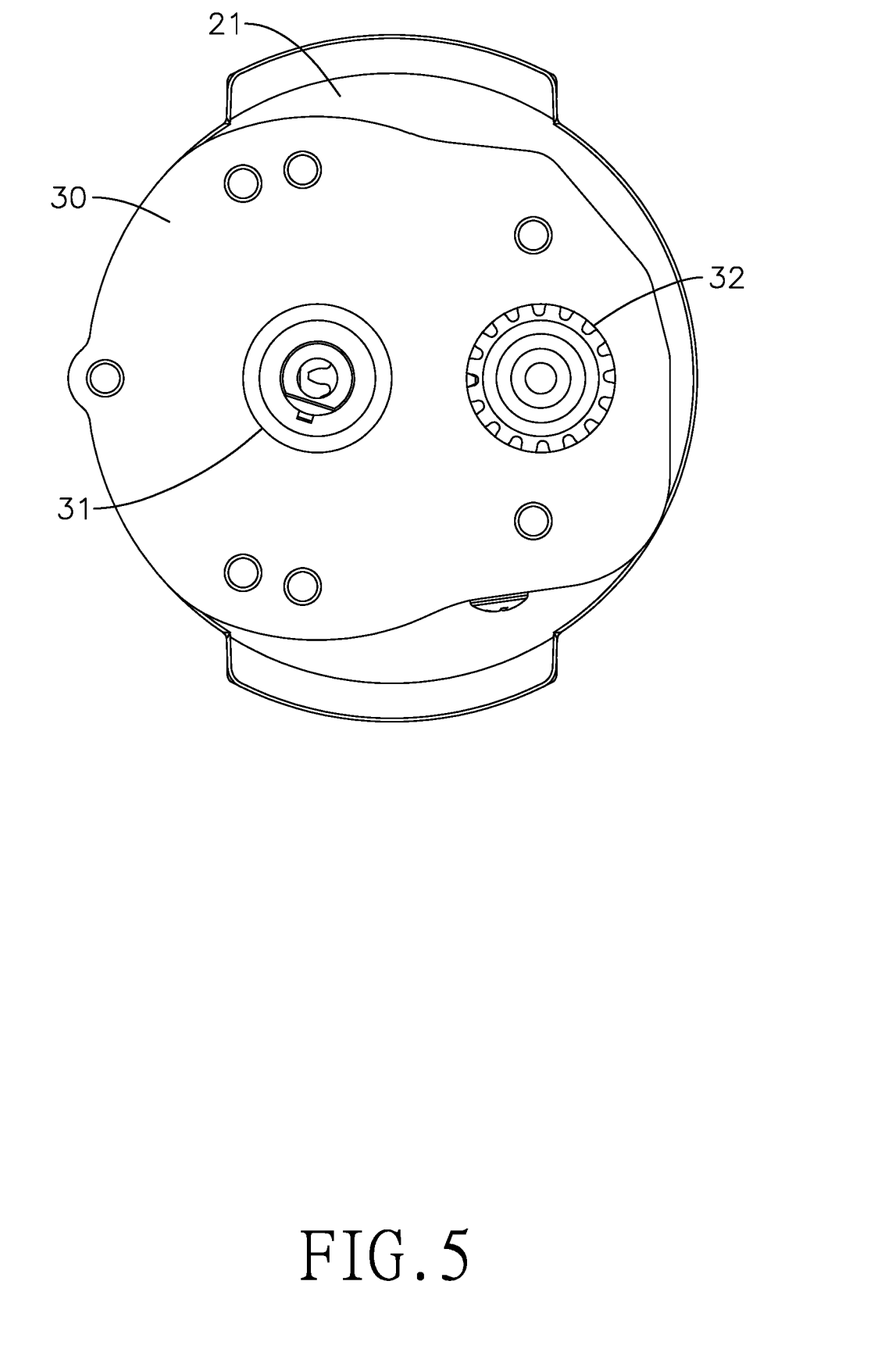
FIG. 5 is an end view of the transmission device and the insulation pad of the distributor in FIG. 1.
Figure 6:
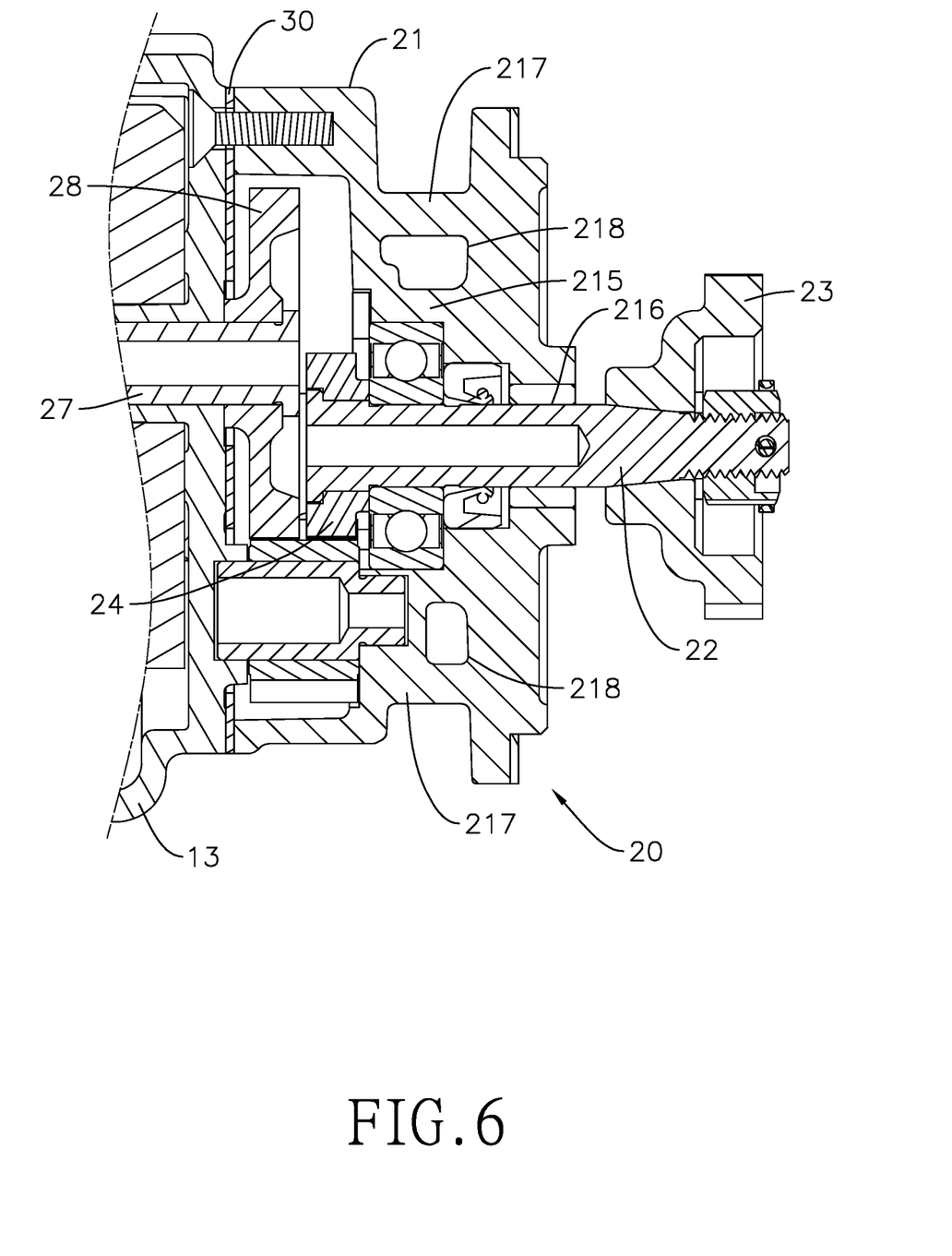
FIG. 6 is an enlarged cross-sectional side view of the distributor in FIG. 1.

With reference to FIGS. 2, 5, and 6, the insulation pad 30 is a sheet with heat insulation effect, is held between and abuts the assembling end surface 131 of the distributor bowl-shaped lower cap 13 and the inner surface 214 of the transmission device 20, corresponds in shape to the assembling end surface 131 of the distributor bowl-shaped lower cap 13 and the inner surface 214 of the transmission device 20, and has a first through hole 31 and a second through hole 32. The first through hole 31 aligns with the first assembling hole 132. The second through hole 32 aligns with the second assembling hole 133. In other words, the insulation pad 30 is held between the distributor bowl-shaped lower cap 13 and the transmission device 20, the passive ignition shaft 27 is mounted through the first through hole 31, the driven shaft 25 is mounted through the second through hole 32. In the present embodiment, the insulation pad 30 is fixed to the inner surface of the transmission housing 21 via multiple fasteners (not shown). However, a way to fix the insulation pad 30 is not limited to the way as described above and can be changed according to user needs.

Figure 7:
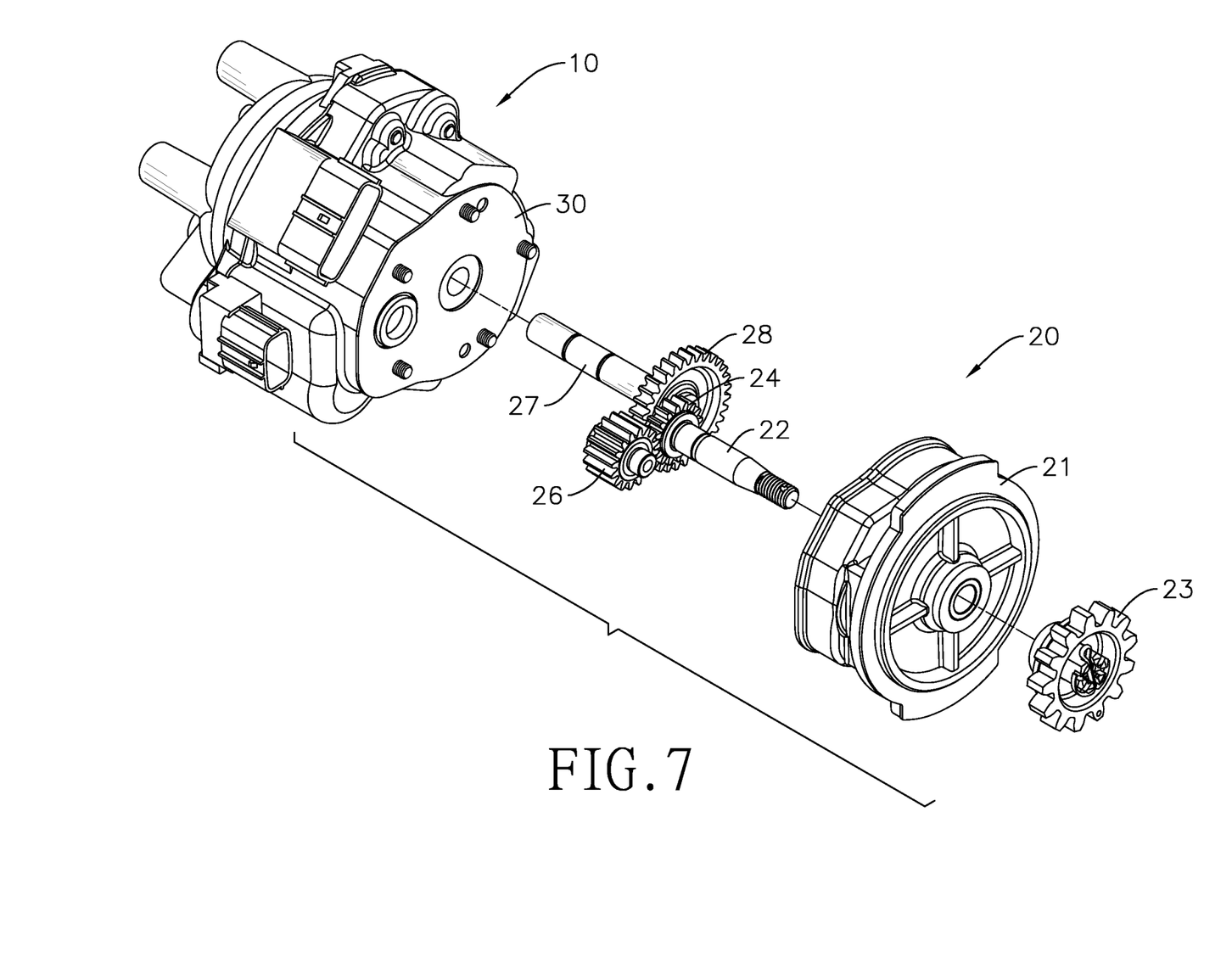
FIG. 7 is another exploded perspective view of the distributor in FIG. 1.

With reference to FIGS. 6 and 7, when the distributor of the present invention is in use, the transmission device 20 is mounted in an engine (not shown) and the driving connector 23 is connected to a power transmission element that is mounted inside the engine (not shown). When the engine starts, the driving connector 23 drives the driving shaft 22 to rotate and the driving gear 24 rotates accordingly. Since the driving gear 24 and the reduction gear 28 are disposed side by side and both mesh with the driven gear 26, the reduction gear 28 and the driving gear 24 rotate in the same direction, such that the passive ignition shaft 27 is driven to drive the rotor 121 to rotate simultaneously in the same direction. Accordingly, a high voltage is distributed to spark plugs of cylinders of the engine. As the insulation pad 30 is mounted between the transmission device 20 and the ignition device 10, heat from the engine can be effectively isolated and heat from the ignition device 10 can also be dissipates. Therefore, an operating temperature of the distributor of the present invention is kept stable, so that a service life of the distributor is increased and stability of the distributor during operation is improved.

In the aforementioned process, the ignition device 10 and the transmission device 20 are clearly separated and the transmission housing 21 is further provided with the reinforcing ribs 217 and the at least one heat dissipation hole 218. Therefore, the heat transferred from the engine to the transmission device 20 can be taken away by air passing through the at least one heat dissipation hole 218, such that the temperature of the distributor can be reduced.

In the aforementioned process, with the driven gear 26 connected between the driving gear 24 and the reduction gear 28, a distance between the driving shaft 22 and the passive ignition shaft 27 can be further reduced. Specifically, in a conventional distributor, a distance between a driving shaft and a passive shaft is the sum of a radius of a relatively large gear and a radius of a relatively small gear. In the distributor of the present invention, the distance between the driving shaft 22 and the passive ignition shaft 27 is the sum of a radius of the reduction gear 28 and a radius of the driving gear 24. Accordingly, volume of the distributor of the present invent is greatly reduced. Moreover, when the user is adjusting an ignition angle, interference due to insufficient spacing between the distributor and other peripheral components of the engine can be omitted.

In the aforementioned process, since the driving shaft 22 and the passive ignition shaft 27 rotate in the same direction, the user would not be confused when doing ignition wiring.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A distributor with heat dissipation effect comprising:
an ignition device including
a distributor upper cap;
a rotor assembly; and
a distributor bowl-shaped lower cap having an assembling end surface and an open end, and the assembling end surface and the open end formed on opposite ends of the distributor upper cap, wherein the distributor upper cap is capped on and is combined with the open end of the distributor bowl-shaped lower cap, such that an inner space is enclosed by the distributor upper cap and the distributor bowl-shaped lower cap, and the rotor assembly is mounted in the inner space;
a transmission device connected to the rotor assembly and including a transmission housing, the transmission housing having an inner surface, and the inner surface facing the assembling end surface of the distributor bowl-shaped lower cap; and
a heat insulation pad held between the distributor bowl-shaped lower cap and the transmission device and abutting the assembling end surface of the distributor bowl-shaped lower cap and the inner surface of the transmission device.

2. The distributor as claimed in claim 1, wherein
the transmission housing further has
an outer surface; and
a driving hole formed through the transmission housing; and
the transmission device further includes:
a driving shaft rotatably mounted through the driving hole and having two opposite ends;
a driving connector securely mounted on one of the ends of the driving shaft and disposed adjacent to the outer surface of the transmission housing;
a driving gear securely mounted on the other end of the driving shaft;
a driven shaft having two opposite ends, one of the ends of the driven shaft rotatably mounted on the inner surface of the transmission housing and the other end of the driven shaft is rotatably mounted to the distributor bowl-shaped lower cap;
a driven gear securely mounted on the driven shaft;
a passive ignition shaft having a first end and a second end, and the first end of the passive ignition shaft is mounted to the rotor assembly; and
a reduction gear mounted on the second end of the passive ignition shaft.

3. The distributor as claimed in claim 1, wherein the transmission housing includes:
an outer side portion, wherein the outer surface of the transmission housing is defined on the outer side portion;
an inner side portion, wherein the inner surface of the transmission housing is defined on the inner side portion; and
multiple reinforcing ribs separately arranged between the outer side portion and the inner side portion, and each of the reinforcing ribs having two ends connected to the outer side portion and the inner side portion respectively, wherein at least one heat dissipation hole is formed between the reinforcing ribs.

4. The distributor as claimed in claim 2, wherein the transmission housing includes:
an outer side portion, wherein the outer surface of the transmission housing is defined on the outer side portion;
an inner side portion, wherein the inner surface of the transmission housing is defined on the inner side portion; and
multiple reinforcing ribs separately arranged between the outer side portion and the inner side portion, and each of the reinforcing ribs having two ends connected to the outer side portion and the inner side portion respectively, wherein at least one heat dissipation hole is formed between the reinforcing ribs.

5. The distributor as claimed in claim 3, wherein the reinforcing ribs are flat and are parallel with each other.

6. The distributor as claimed in claim 4, wherein the reinforcing ribs are flat and are parallel with each other.

7. The distributor as claimed in claim 5, wherein
a rotation axis of the reduction gear is parallel with a rotation axis of the driving gear; and
a meshing position, at which the reduction gear meshes with the driven gear, and a meshing position, at which the driving gear meshes with the driven gear, are adjacent to each other.

8. The distributor as claimed in claim 6, wherein
a rotation axis of the reduction gear is parallel with a rotation axis of the driving gear; and
a meshing position, at which the reduction gear meshes with the driven gear, and a meshing position, at which the driving gear meshes with the driven gear, are adjacent to each other.

9. The distributor as claimed in claim 7, wherein
the distributor bowl-shaped lower cap has a first assembling hole and a second assembling hole separately formed through the assembling end surface;
the insulation pad has
a first through-hole aligning with the first assembling hole; and
a second through-hole aligning with the second assembling hole;
the passive ignition shaft is mounted through the first through-hole; and
the driven shaft is mounted through the second through-hole.

10. The distributor as claimed in claim 8, wherein
the distributor bowl-shaped lower cap has a first assembling hole and a second assembling hole separately formed through the assembling end surface;
the insulation pas has
a first through-hole aligning with the first assembling hole; and
a second through-hole aligning with the second assembling hole;
the passive ignition shaft is mounted through the first through-hole; and
the driven shaft is mounted through the second through-hole.

* * * * *